E. F. BLOSS.
ART OF TREATING ANIMAL HEADS.
APPLICATION FILED JAN. 2, 1913.
1,059,339.
Patented Apr. 22, 1913.
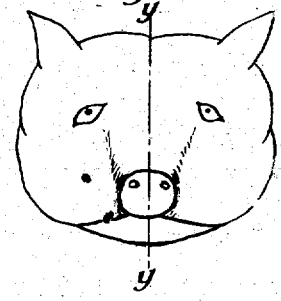
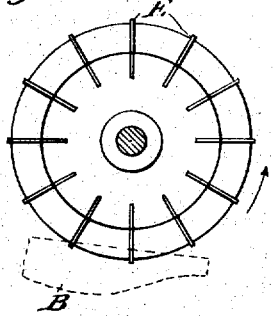
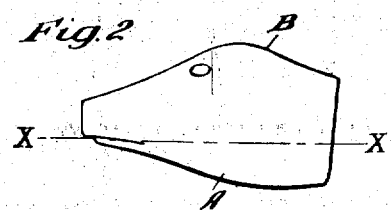
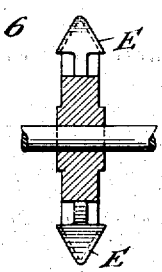
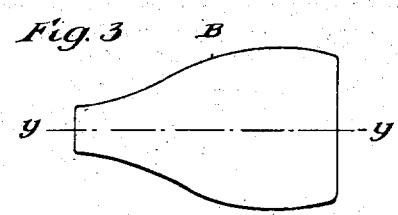
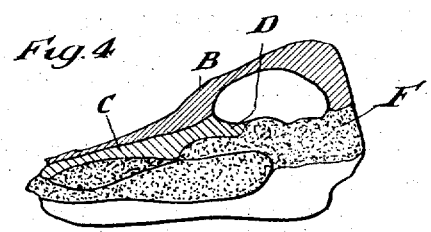
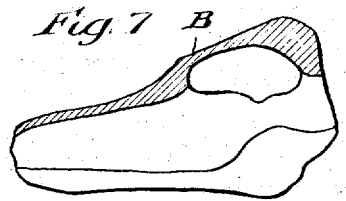
Witnesses:
Wm. Geiger
Pearl Abrams
Inventor:
Ernest Fred Bloss
By Munday, Evarts, Adcock & Clarke,
his Attys

UNITED STATES PATENT OFFICE.

ERNEST FRED BLOSS, OF CLEVELAND, OHIO.

ART OF TREATING ANIMAL-HEADS.

1,059,339.  Specification of Letters Patent.  Patented Apr. 22, 1913.

Application filed January 2, 1913. Serial No. 739,595.

*To all whom it may concern:*

Be it known that I, ERNEST FRED BLOSS, a citizen of the United States, residing in Cleveland, in the county of Cuyahoga and State of Ohio, have invented a new and useful Improvement in the Art of Treating Animal-Heads, of which the following is a specification.

This invention relates to a process of treating the heads of animals to render the same fit for use as food, and it consists in the method of treatment hereinafter more fully set forth and made the subject of claim.

In the accompanying drawing which forms a part of this specification, Figure 1 is a front view of the head of a hog; Fig. 2 a side view of the same after the cheeks, ears, flesh and fat have been removed by the first step of the operation; Fig. 3 an inverted view of the upper portion of said head showing the jaw removed as by the second step of the process; Fig. 4 a side view of one half of the upper portion shown in said Fig. 3 when said portion is split as required by the third step of the process; Fig. 5 a view of the part shown in said Fig. 4 undergoing the fourth and final step of the process; Fig. 6 a sectional view of the rotary cutter used in said fourth step; and Fig. 7 a view of the part shown in Fig. 4 after it has been treated and rendered fit for food uses.

It has been found to be impossible to use in their entirety the heads of beef cattle, hogs, sheep and goats for food owing to the existence in the upper part of the head just above the jaw of a tract or part infected by the presence of mucous substances containing material unfit to be permitted to remain in the presence of edible fats or flesh. This especially unfit part is the ethmoid and turbinated bones and the nasal passages in contact therewith and the mucous membranes covering the same with the secretions adhering thereto. These bones are somewhat spongy and are saturated and permeated with the infected and undesirable substances which should not be permitted to invade the edible or clean portions and which must be removed before this part of the head is fit for food. Owing to the difficulty of removing this infecting portion in a practical way it has become the custom prior to the present invention after the cheeks, ears, flesh and exterior fat are cut off and the brain saved to solve the problem by simply throwing the remainder of the upper portion of the head into the grease tank as entirely inedible. But I have discovered, and herein my invention consists, that it is possible to remove entirely the turbinated and ethmoid bones from the upper portion of the head together with all of the infected tract or part without infecting the adjacent tissue, by means of the cutting and centrifugally throwing action of rapidly revolving cutters against which the upper portion of the head to be treated is brought after the same has been split to expose the nasal passages. This operation removes the turbinated and ethmoid bones completely from the remainder of the head, together with all infected mucous membranes and immediately adjacent tissue and acts to throw the broken up and severed material entirely away from the edible portion of the head. The result is a large part of the head which has been hitherto deemed unfit for any food uses may be treated for food. Moreover the operation is one which can be practiced cheaply and rapidly so that it is an entirely practical method and cheap enough to be used. For it must be borne in mind that the entire value of this portion of the animal's head is not great enough to justify a costly method of treatment, while at the same time it is of sufficient value that it ought not to be treated as a waste or inferior product as has been the general usage.

In the practice of this process the animal's head, for example the hog's head such as is pictured in the front view, Fig. 1, is first denuded of the skin, cheeks, ears and accessible fats and brought into the condition shown in Fig. 2, which is the first step or operation. Thereafter the lower jaw A below the line X—X is removed which may be treated in any of the well known ways and which subsequent treatment of the lower jaw forms no part of this process. The upper jaw and brain case B is split down the median line Y—Y, Figs. 1 and 3, into two halves, one of which is shown at Fig. 4 and the other of which is of course the counterpart thereof. The infected tract consists of the turbinated bone C and the ethmoid bone D, and the mucous surfaces F connected therewith. It is the purpose of this process to remove these entirely, leaving the upper portion of the head in the condition illustrated at Fig. 7. To do this, a half B of the upper portion of the head is presented to the cutting action of rapidly revolving beating knives E as illustrated in Fig. 5, said knives acting to cut out and throw away from the head the entire mucous surfaces and ethmoid and turbinated bones, leaving the upper portion of the head clean and wholesome as indicated in Fig. 7, and as fit for food as any other edible part of the animal. Special machinery for presenting and holding the heads to the revolving cutters is not necessary as this may be done quite practically, successively and rapidly by hand. Specially formed cutters also are not required as the common rapidly revolving cutters ordinarily used in the packing house for dehairing or cleaning pigs feet may be employed for the purposes of this invention if desired. The saving effected by this invention amounts to more than half of the valve of that portion of the head finally treated.

I claim:—

The herein described process of treating heads of animals, that consists in splitting the same and in cutting out and discharging the turbinated and ethmoid bones and their attached membrances by a cutting and throwing operation, substantially as specified.

ERNEST FRED BLOSS.

Witnesses:
WM. HOFFMAN,
G. G. VAN BUREN.

---

Copies of this patent may be obtained for five cents each, by addressing the "Commissioner of Patents, Washington, D. C."

---

Corrections in Letters Patent No. 1,059,339.

It is hereby certified that in Letters Patent No. 1,059,339, granted April 22, 1913, upon the application of Ernest Fred Bloss, of Cleveland, Ohio, for an improvement in "The Art of Treating Animal-Heads," errors appear in the printed specification requiring correction as follows: Page 2, line 11, for the word "successively" read *successfully;* same page, line 19, for the word "valve" read *value;* and that the said Letters Patent should be read with these corrections therein that the same may conform to the record of the case in the Patent Office.

Signed and sealed this 20th day of May, A. D., 1913.

[SEAL.]

C. C. BILLINGS,
*Acting Commissioner of Patents.* ing knives E as illustrated in Fig. 5, said knives acting to cut out and throw away from the head the entire mucous surfaces and ethmoid and turbinated bones, leaving the upper portion of the head clean and wholesome as indicated in Fig. 7, and as fit for food as any other edible part of the animal. Special machinery for presenting and holding the heads to the revolving cutters is not necessary as this may be done quite practically, successively and rapidly by hand. Specially formed cutters also are not required as the common rapidly revolving cutters ordinarily used in the packing house for dehairing or cleaning pigs feet may be employed for the purposes of this invention if desired. The saving effected by this invention amounts to more than half of the valve of that portion of the head finally treated.

I claim:—

The herein described process of treating heads of animals, that consists in splitting the same and in cutting out and discharging the turbinated and ethmoid bones and their attached membrances by a cutting and throwing operation, substantially as specified.

ERNEST FRED BLOSS.

Witnesses:
WM. HOFFMAN,
G. G. VAN BUREN.

---

Copies of this patent may be obtained for five cents each, by addressing the "Commissioner of Patents, Washington, D. C."

---

Corrections in Letters Patent No. 1,059,339.

It is hereby certified that in Letters Patent No. 1,059,339, granted April 22, 1913, upon the application of Ernest Fred Bloss, of Cleveland, Ohio, for an improvement in "The Art of Treating Animal-Heads," errors appear in the printed specification requiring correction as follows: Page 2, line 11, for the word "successively" read *successfully;* same page, line 19, for the word "valve" read *value;* and that the said Letters Patent should be read with these corrections therein that the same may conform to the record of the case in the Patent Office.

Signed and sealed this 20th day of May, A. D., 1913.

[SEAL.]

C. C. BILLINGS,
*Acting Commissioner of Patents.*

Corrections in Letters Patent No. 1,059,339.

It is hereby certified that in Letters Patent No. 1,059,339, granted April 22, 1913, upon the application of Ernest Fred Bloss, of Cleveland, Ohio, for an improvement in "The Art of Treating Animal-Heads," errors appear in the printed specification requiring correction as follows: Page 2, line 11, for the word "successively" read *successfully;* same page, line 19, for the word "valve" read *value;* and that the said Letters Patent should be read with these corrections therein that the same may conform to the record of the case in the Patent Office.

Signed and sealed this 20th day of May, A. D., 1913.

[SEAL.]
C. C. BILLINGS,
*Acting Commissioner of Patents.*